United States Patent
Hein

(10) Patent No.: US 9,239,956 B2
(45) Date of Patent: Jan. 19, 2016

(54) METHOD AND APPARATUS FOR CODING OF EYE AND EYE MOVEMENT DATA

(71) Applicant: Oliver Hein, Hamburg (DE)

(72) Inventor: Oliver Hein, Hamburg (DE)

( * ) Notice: Subject to any disclaimer, the term of this patent is extended or adjusted under 35 U.S.C. 154(b) by 0 days.

(21) Appl. No.: 13/927,143

(22) Filed: Jun. 26, 2013

(65) Prior Publication Data

US 2014/0003658 A1  Jan. 2, 2014

Related U.S. Application Data

(60) Provisional application No. 61/665,331, filed on Jun. 28, 2012.

(51) Int. Cl.
*G06K 9/00* (2006.01)

(52) U.S. Cl.
CPC ........ *G06K 9/00597* (2013.01); *G06K 9/00335* (2013.01)

(58) Field of Classification Search
CPC .................... G06T 2207/30041; G06T 7/20
USPC .................. 382/103, 116, 117, 275
See application file for complete search history.

(56) References Cited

U.S. PATENT DOCUMENTS

| | | | |
|---|---|---|---|
| 6,102,870 A * | 8/2000 | Edwards ................ | 600/558 |
| 6,252,989 B1 * | 6/2001 | Geisler et al. .......... | 382/232 |
| 7,029,121 B2 * | 4/2006 | Edwards ................ | 351/246 |
| 7,922,670 B2 * | 4/2011 | Jones et al. ............ | 600/558 |
| 8,379,918 B2 * | 2/2013 | Pfleger et al. .......... | 382/103 |
| 8,436,859 B2 * | 5/2013 | Helfman et al. ....... | 345/443 |
| 8,493,390 B2 * | 7/2013 | Kalinli ................... | 345/428 |
| 2006/0002628 A1 * | 1/2006 | Dolan et al. ........... | 382/286 |
| 2006/0018526 A1 * | 1/2006 | Avinash ................. | 382/132 |
| 2006/0189886 A1 | 8/2006 | Jones et al. | |
| 2009/0086162 A1 | 4/2009 | Ito et al. | |
| 2009/0086165 A1 * | 4/2009 | Beymer ................. | 351/210 |
| 2010/0118030 A1 | 5/2010 | Helfman et al. | |

FOREIGN PATENT DOCUMENTS

WO  2009153724  12/2009

OTHER PUBLICATIONS

Goldberg, Joseph H. Helffman, Johnathan I. "Scanpath Clustering and Aggregation". Association for Computing Machinery. 2010.*

(Continued)

*Primary Examiner* — Kim Vu
*Assistant Examiner* — Molly Delaney
(74) *Attorney, Agent, or Firm* — Renner, Otto, Boisselle & Sklar, LLP

(57) ABSTRACT

An apparatus and method of encoding eye movements and eye tracking data (DAT), represented as time and space parameters (t, x, y) obtained by an eye tracking device and assigned each to a viewpoint (A, B, C, D, E . . . ). Pairs of numbers (Z0,Z1; Z0,Z2; Z0,Z3 . . . ) are taken from the groups of numbers and are combined with each other to obtain for each combination a value (W) that indicates at least a spatial distance (S) between two viewpoints (E, C), wherein the obtained values (W) represent an encoding of the eye movement and eye tracking data (DAT). Preferably the values (W) are determined and stored in form of a first matrix (M) or array. The matrix is subjected to one or more operations (smooth filtering, anisotropic filtering, threshold filtering, anisotropic diffusion) such that the resulting matrix represents an encoding of fixations, saccades and smooth pursuit of a raw data scanpath.

6 Claims, 14 Drawing Sheets

(56) References Cited

OTHER PUBLICATIONS

Bardera, Anton, Feizas Miquel, Boada, Imma, Sbert Mateu. "Compression-based Image Registration" ISIT 2006.*

Durand, Fredo. Dorseym Julie, "Fast Bilateral Filtering for the Display of High-Dynamic-Range Images" Association for Computing Machinery. 2002.*

Jarodzka, Halszka. Holmqvist Kenneth. "A Vector-based Multidimensional Scanpath Similarity Measure" Proceedings of the 2010 Symposion on Eye-Tracking Research and Application. 2010.*

Partial Search Report for corresponding European Application No. 13174043.3 dated Aug. 13, 2014.

Search Report for corresponding European Application No. 13174043.3 dated Oct. 7, 2014.

Foerster, R. M. & Schneider, W. X., Functionally sequenced scanpath similarity method (FuncSim): Comparing and evaluating scanpath similarity based on a task's inherent sequence of functional (action) units, Journal of Eye Movement Research, 2013, 6(5):4, 1-22.

Foulsham, T.; Dewhurst, R.; Nyström, M.; Jarodzka, H.; Johansson, R.; Underwood, G. & Holmqvist, K., Comparing scanpaths during scene encoding and recognition: A multi-dimensional approach, Journal of Eye Movement Research, 2012, 5, 1-14.

\* cited by examiner

METHOD AND APPARATUS FOR CODING OF EYE AND EYE MOVEMENT DATA

BACKGROUND

The invention refers to a method and to an apparatus for encoding eye movement and eye tracking data. In particular the invention refers to the encoding of eye movement and eye tracking data for gaze contingent control within a man machine interaction. The gaze contingency by means of the present invention shall be applied for example to the field of user-dependent eye movement controlled processes within technical apparatus such as machines, devices, computers, equipments, vehicles etc.

From the prior art there are known methods and apparatus for capturing eye movement and eye tracking data from persons in order to display the so-called raw data scanpath, i.e. the time course of gaze, representing the movement of the eyes or visual behavior of the person when viewing pictorial presentations, e.g. photos, advertisement posters or a dynamic scene, e.g. a situation while driving a car, watching a film etc. Usually, eye movement and eye tracking data are captured by using an eye tracking device, a so-called eye-tracker.

Such a method and such an eye tracking device is disclosed e.g. in WO 99/18842 A1. There is described a data evaluation by which typical eye movement patterns can be recognized.

Another method from the prior art known is disclosed e.g. in U.S. RE 40014 E1.

The known eye trackers provide time-resolved position data of the head and of the eyes of a test person/subject. There can be determined from these data, the time-resolved intersections of the line of sight of the viewer with the objects of static or dynamic scene, such as those arising when looking at a poster, an advert, the control panel of a machine (e.g. car or airplane cockpit), the display of a computer, etc. For this purpose, the position data of the head and the eyes of the viewer are determined at a relatively high sampling rate or frequency of up to 2000 Hz or more.

For the recording of data, there are usually various techniques available. For a wide range of applications, the most suitable technique, as being minimally invasive and therefore not burdensome to the subject or restrictive, is the video-based recording of the head of the subject at two different angles in the range of infrared light and a subsequent image processing, calculating from the image data in combination with geometry data of the experimental setting the position data of the head and the eyes.

From the image analysis, after a prior calibration, the head position and iris/pupil positions can be determined. This determination is often carried out in real-time and is performed by software being supplied by the manufacturer of the eye tracker. The data having this format, however, cannot be interpreted or understood by an end user, such as a psychologist who studies the scheme or visual behavior of watching a commercial. Therefore there is a need to process the data in an end-user friendly representation.

Usually the classification and interpretation of the data is performed by a decomposition of the recorded time series into fixations (cluster of viewpoints) and ballistic movements/jumps (saccades), where from a (cognitive) psychological perspective the fixations are of interest and the saccades are interesting in respect of the basic physiological processes. However, the computational methods and algorithms which are well-known for this purpose, are based on an evaluation of the viewpoints according to their spatial dispersion and/or to their velocity or acceleration. The algorithms require a parameterization done by the end user or default settings for the parameters done by the manufacturer which cover a wide application range, thereby becoming too imprecise for being used for specific applications, since the choice of parameterization can significantly affect the results of the algorithm. Further, the parameters are partly subjected to individual variations, referring to the subject or to a group of subjects, and/or are dependent on the tasks which are given for running the experiment. Therefore, in the known calculation methods and algorithms, the end user must have experience in the choice of parameters, which in practice is rarely the case, or he must rely on an approximate parameterization ("rule of thumb"). The known calculation methods or algorithms are not designed for the analysis of dynamic scenes where the viewer follows moving objects with his eyes. The separation of another kind of eye movement, the so-called smooth pursuit, as it occurs when watching dynamic scenes, is currently regarded as being difficult and has not yet been satisfactorily solved.

SUMMARY

It is therefore an object of the invention to propose a method and an apparatus or device which allows an evaluation of eye movement and eye tracking data, wherein the aforementioned drawbacks are overcome. In particular, the invention is intended to enable fast and reliable detection of fixations and saccades to improve the control of man-machine interactions. Furthermore, the invention shall provide the identification of smooth pursuits when dynamic scenes are watched. The invention is intended to be used in many areas of engineering, namely wherever human-machine interactions are desired or required to provide the control of machines, equipment, computers, plants, vehicles, etc. The invention is also intended to be applicable in scientific areas such as human factors, reading, neurology, physiology, psychology etc. The invention shall also be applicable in the field of marketing and advertisement.

To achieve these objects, an inventive method comprising the features of claim 1 and an apparatus comprising the features of the independent claim are proposed.

Accordingly, the invention proposes a method of encoding eye movement and eye tracking data, wherein the eye movement and eye tracking data represent time and space parameters in the form of groups of numbers being obtained by means of an eye tracking device and each being assigned to a viewpoint, wherein pairs of numbers are taken from the groups of numbers and are combined with each other to obtain for each combination a value that indicates at least a spatial distance between two viewpoints to which the respective pair of numbers is assigned, wherein the obtained values represent an encoding or code of the eye movement and eye tracking data.

Preferably, the groups of numbers represent triples of numbers according to the time and space parameters, wherein two triples of numbers are taken in pairs and are combined with each other to obtain for each combination a value that indicates at least the spatial and temporal distance between two viewpoints.

Preferably, the values (results of all possible combinations) are determined and stored in form of a first matrix or array. The first matrix is subjected to a smooth filtering, in particular an anisotropic filtering, to obtain a second matrix which has in comparison to the first matrix a (significantly) reduced data amount or volume. In general an anisotropic diffusion can be used which is the approach via partial differential equations as opposed to the anisotropic filtering. The first and/or second matrix can be subjected to a threshold value-based filtering to obtain a third matrix which has in comparison to the first/second matrix a (even more) reduced data amount or volume. The first, second and/or third matrix represent(s) an encoding of visual fixations, smooth pursuits, and saccades of a raw data scanpath.

Further to this, the smooth filtering of the first matrix can be performed in the form of an anisotropic diffusion to obtain a fourth matrix which represents an encoding of fixations, saccades and smooth pursuit of said raw data scanpath.

The invention thus provides a method which enables a ternary classification of the position data into fixations and saccades and (optional) smooth pursuits in a robust manner being specific for the experiment and which do not need to be parameterized by the end user, or enable an intuitive and visually guided configuration when it is desired by the end user, for reasons of reproducibility and validation.

The invention provides an integrated solution for evaluation of eye movement and eye tracking in the form of time series and uses eye and eye movement data which arise as time-resolved spatial data during the operation of an eye-tracker in various fields, such as the usability research, advertising and market research, computer control (Man-Machine Interface), driving or flight simulators, psychology, medical diagnostics etc. The method of the present invention uses the eye movement and eye tracking data in their raw form and applies to these raw data one or more processing steps in order to provide the function a) of reducing noise/data errors and b) of extracting technical/subject-specific information from the raw data. The proposed solution includes an integrated system of process steps for an automated performance of the functions a) and b) and supplies a code or an encoding for the representation of the view or gaze process and the analysis thereof. All process steps of the proposed solution and the processing modules can be integrated in a device or apparatus for controlling and supporting human-machine interactions, and thus enable the control to be operated by the end user in an intuitive way.

An important aspect of the method presented here is the compression or specification of the data compression and by combining methods from a broad spectrum of mathematics (geometry, topology, algebra, differential equations, etc.) and by the interpretation of the specified data in using information-theoretic methods. The systematization of the obtained data specification is performed by the use of machine learning algorithms. By combining the methods a high degree of automation and data aggregation is achieved, as being required by the enduser, and the degree of abstraction necessary for the interpretation of the results is reached. The process chain is parameter-free for the end user, which is particularly advantageous, since the end user usually has no methodological knowledge in the field of algorithms being applied here, but relies on the implemented methods to provide the necessary final evaluations in a robust form. The possible high robustness and reliability of the solution according to the invention is particularly advantageous when considering it in the context with gaze contingent control of machines and in medical diagnostics. The invention is not limited to these applications but can be generally used for any kind of man-machine interaction The invention can be realized in a wide range of possible fields of application:

Currently of particular interest is the field of the so-called gaze contingent technologies and displays. This technical field includes a gaze controlled adaptation of the computer display/desktop to the user's interests. For this purpose the position of the user's head and eyes is recorded by two cameras installed at the computer and the fields of the user's interests are calculated and displayed on the screen. In response to the content shown there, the local information is then adapted. Thus e.g. a reading help can locally enlarge the text or can offer a translation of foreign language texts if there is some stagnation during the reading. For smartphones, a selective enlargement (zooming) is often desirable since the display size is limited.

Another application is the control of mouse pointers, cursors, and the like. For the operation of the computer a so-called "gaze mouse" is under construction, i.e. a solution wherein cursor movement is controlled by the view of the user (complementary to the touch screen). For the support of people with a severe physical disability a so-called "gaze keyboards" is under construction, i.e. a solution wherein key input is controlled by the view of the user. The integration of cameras into the hardware of a computer is no problem with regard to technology or price. The current restriction lies in the analysis and interpretation of the gaze data. Thus, the eye movement is a largely unconscious action, in comparison to the movement of hands, and the practical use of eye movements still raises many questions. This example can be extended almost arbitrarily:

For example, gaze-controlled driver assistance systems are used to provide additional information to the driver, depending on the traffic situation and specifically to warn him in dangerous situations (incipient fatigue, fail to look in the rearview mirror during an overtaking maneuver etc.). In medicine there is a significant potential for the early diagnosis of neurological diseases, when large groups of patients can systematically be evaluated. In advertising, this applies to the study of consumer groups. For this purpose, so-called mobile gaze trackers are used. The prototypes of glasses with built-in computers show that the restrictions of the hardware are getting smaller.

DETAILED DESCRIPTION

The invention is described further below by means of embodiments and with reference to the accompanying drawings (FIGS. 1 to 10).

Figure 1:
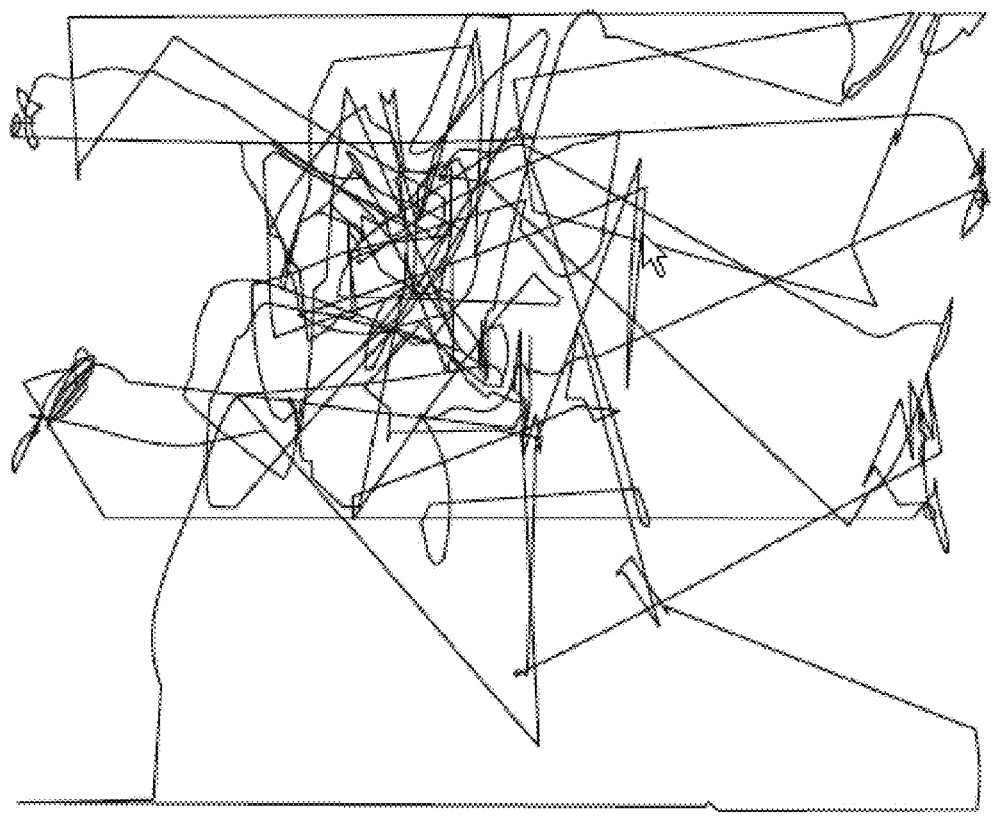
FIG. 1 is a diagram of a raw data scanpath in a trajectory representation which reflects the eye movement of a subject.

In FIG. 1 a diagram of a raw data scanpath is shown in the trajectory representation which reflects the eye movement of a subject when viewing a visual stimulus (e.g. a website). Where the scanpath for a time-period is limited to a local area, one speaks of a fixation. Where the raw data scanpath quickly run from one fixation the next one, this is a ballistic movement, the segment is called saccade. The gaze trajectory of the gaze ray is the graphical representation of eye movements and it's eye tracking data which are provided by a conventional eye-tracker. For recording the data, various techniques are available. For a broad-based application, the technique being most suitable, as being minimally invasive and therefore not burdensome or restrictive to the subject, is the video-based recording of the head of the subject at two different angles in the infrared range of light and a subsequent image processing, calculating from the image data in combination with geometry data of the experimental setting the position data of the head and eyes. The invention builds on the head/eye position data and the intersection of the gaze ray with the observed objects.

Figure 2:
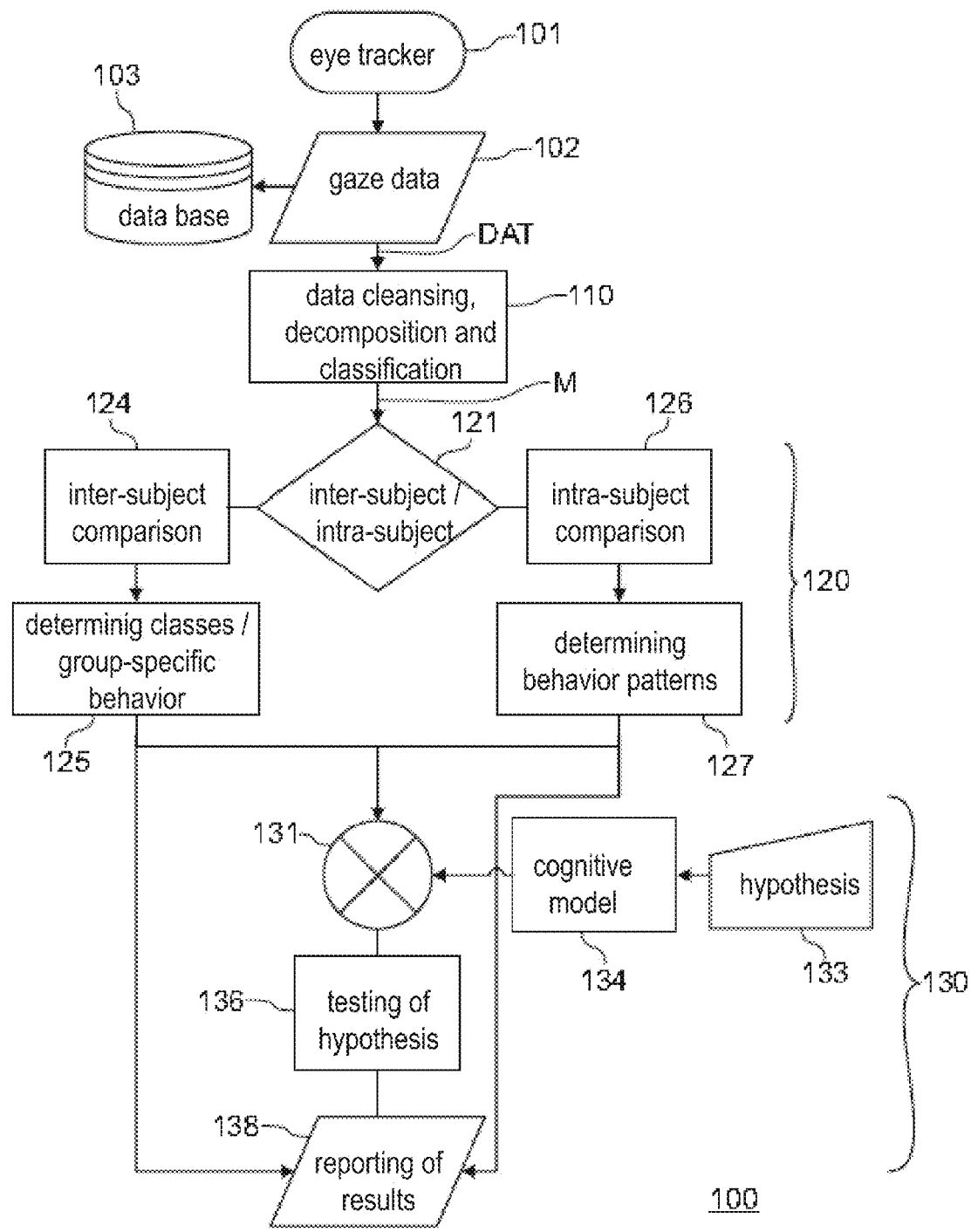
FIG. 2 is a flowchart of the inventive method.

FIG. 2 shows a flowchart of the inventive method 100, which can be roughly divided into the following sections:

a) Detecting and storing the image data by means of an eye tracker (steps 101-103);

b) Initial or first data processing, in particular cleansing, decomposing/separation and classification (step or block 110), wherein first matrix M is generated from the raw data DAT.

c) Further data processing (optional block 120), wherein one or more structures are detected within the generated matrix (cleansed data), the structures representing typical individual visual behavior patterns (steps 126-127) or group-specific view behaviors (steps 124-125);

d) Subsequent data analysis (block 130), wherein the processed data (matrix) is linked to one or more cognitive models to assign the view pattern or mode of visual behavior to an assumed underlying cognitive process.

The invention can use a commercially available device for recording of eye movement as eye tracking data (eye tracker block 101) and a database (block 103) for storing the data. In the database also a software library can be stored which includes the algorithms for automatic analysis of the data, as well as a desktop computer/user interface and representation layer which provides the modules to the end user in an intuitive form that fits to his technical subject.

The Invention Provides a Fast and Reliable Separation of Raw Data Scanpaths into Fixations, Saccades, and Smooth Pursuit Movements:

The present invention discloses a method that provides a ternary classification of the position data into fixations, saccades, and smooth pursuit movements in a robust manner being specific for the research without any need to be parameterized by the end user, and provides an intuitive, visually guided configuration if this is desired by the user, for reasons of reproducibility and validation. In addition, the invention allows a linkage of the obtained and processed data to cognitive architectures (see block 130 in FIG. 2).

The Invention Provides a Connection or Linkage to Cognitive Architectures:

Due to the complexity of the processes, which underlie the movements of the eyes, there is currently no definite model, which can describe the empirical eye movements and eye tracking data in an exhaustive manner. At the present state of research, it is prevailing opinion that, apart from simple paradigms, there must be a mixture of low-lying physiological base processes (bottom-up) and higher cognitive processes (top-down). For the most relevant issues in practice, a modeling must take both of these levels into account. In order to take into account the higher-order cognitive processes, the proposed solution provides an interface to current cognitive architectures.

The Invention Also Includes the Formation of Groups of Viewers by Machine Learning:

For this, a combination of evaluation methods is proposed which allows the comparison and classification of scanpaths across experimental groups in a robust manner. The evaluation or analysis does not require specific input from the end user, but provides the data in those abstracted form which is required by the end-user. To this, raw scanpath data must be brought into a form which permits an explicit comparison in the form of comparison metrics. The proposed solution furnishes such metrics and provides the classification/clustering in the form of graphs. Furthermore, the solution also makes the common metrics available to be compatible with established methods.

A reliable assessment of the assumed model is improved by the explicit comparison of the eye movement and tracking data from experimental groups preferably having an extensive size. These data key figures can tested by means of the usual statistical tests. The solution integrates common test statistics, such as ANOVA, etc.

As for the Data Storage and Algorithm Implementation, the Following Shall be Considered:

Due to the high sampling rate for the data (up to 2000 Hz and above), the time span in practice-relevant stimuli (a commercial takes several tens of seconds to minutes), and the size of experimental groups, very large data volumes are produced. Their effective processing requires, even with modern hardware, some appropriately designed methods to keep the working/processing load of the machine and for experimenters as low as possible. The proposed solution is to provide new methods which have not yet been used in conjunction with eye tracking data. The implementation of the algorithms uses the possibilities of computing on multiprocessor architectures and computing on graphics card(s).

A further key aspect in the implementation of the integrated solution is the runtime aspect. All reports can be made interactive and do not require, on a standard PC/laptop, longer computation time. This is a great advantage for practical use. The Invention Proposes an Eye/View Course Description (Scanpath) by a Space-Time Matrix:

Logging or recording the position data is performed by a finite sequence of view or gaze points $GP_i$. The view or gaze points are stored as a list of number triples $(t,x,y)_{i \in \{0,1,\ldots,n\}}$. The set of number triples $\{GP_i\}$ is denoted by $GP=\{GP_i\}$, wherein the coordinates x,y,t are assumed to be continuous or discrete ("pixel coordinates"), wherein the measurements are, due to the finite measuring accuracy, always discrete.

Figure 3A:
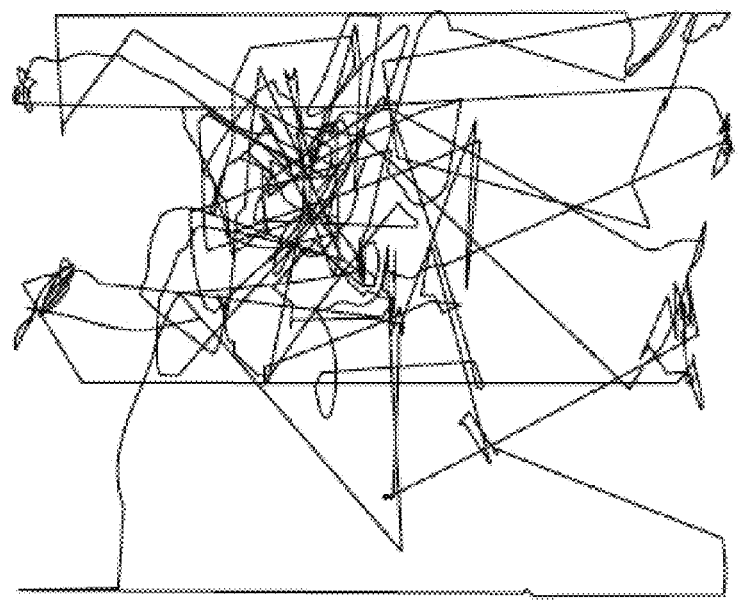
FIGS. 3a-3c illustrate an exemplary path with respect to the Euclidean metric.
Figure 3B:
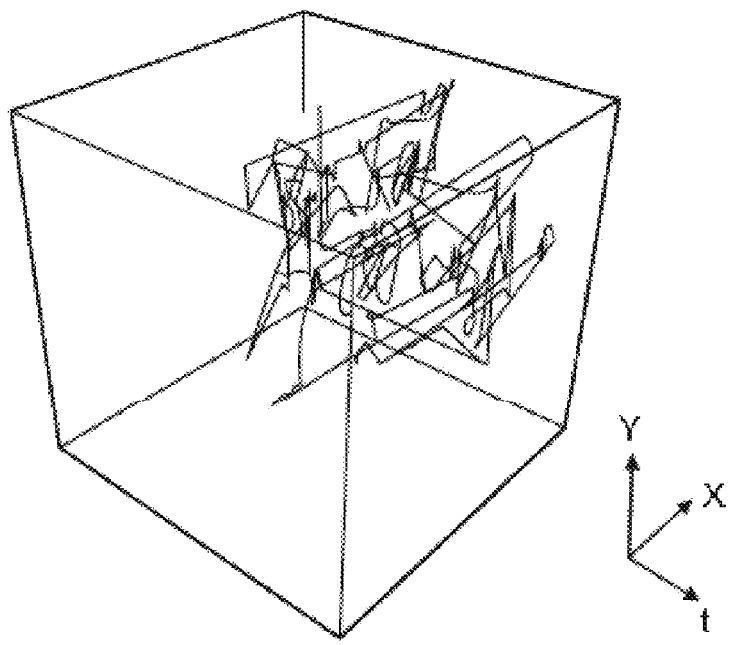
Figure 3C:
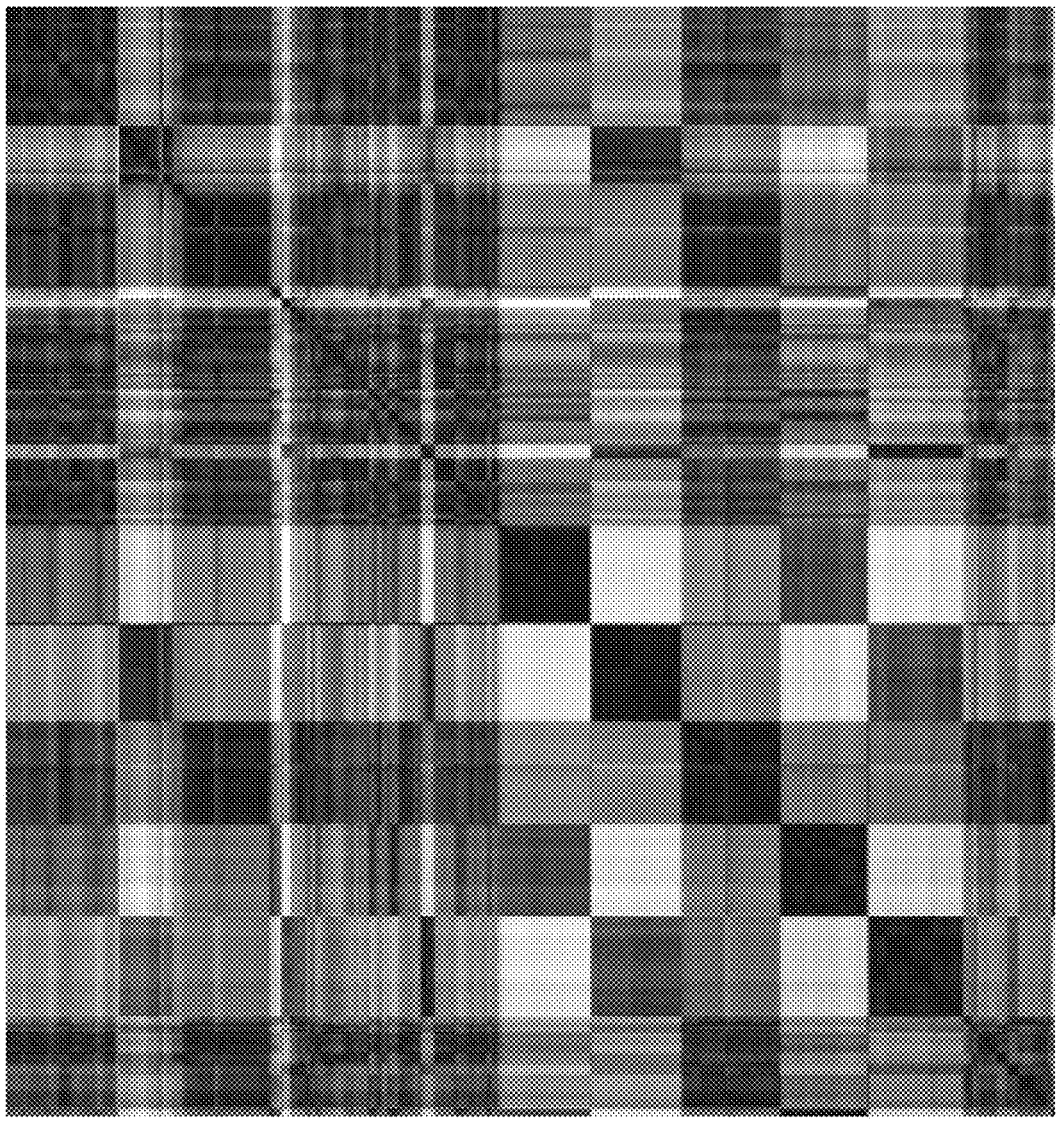

The solution proposed here describes the data through a space-time matrix (space-time matrix, ST-matrix, STM)$[d]_p$ which contains all possible distances d (see also S in FIG. 4a) between all space-time points. The distance d between two spatial (-time) points can be determined with respect to several metrics (Euclidean, Minkowski $l_p$, Minkowski space-time, etc.). This results in an invariant representation with respect to the respective symmetry group. To get a better intuitive understanding, the distance matrix can be represented as a gray image. The gray image is obtained by the (affine) representation or image of the distances within the gray scale range. This shall be explained as an example for the path shown above with respect to the Euclidean metric by means of FIGS. 3a-c:

The raw data which are represented by the gaze trajectory or scanpath (see FIG. 3a which is a scaled down illustration corresponding to FIG. 1) can also be represented in a three dimensional representation by means of space-time points (see FIG. 3b with spatial coordinates x and y and time coordinate t). The matrix M is generated from the raw data (see FIG. 3c). The matrix is an encoding or an information code for the visual or gaze behavior. By the data processing described further below (also see block 110 in FIG. 2) the information can be further compressed, resulting in a highly efficient scanpath representation.

The matrix M is symmetric, since the (Euclidean) distance is symmetric. The matrix includes the raw scanpath data represented in the space-time domain and thus will also be named here space-time matrix or STM in short. It is clearly visible in the STM, that there is a block-like/rectangle-like/rectilinear/isothetic structure, showing the clustering of the path in the space-time domain. This structure is the basis for extracting the interesting features of the scanpath in model-building. The isothetic pattern with respect to the time axis makes the STM to be simply evaluable.

Figure 4A:
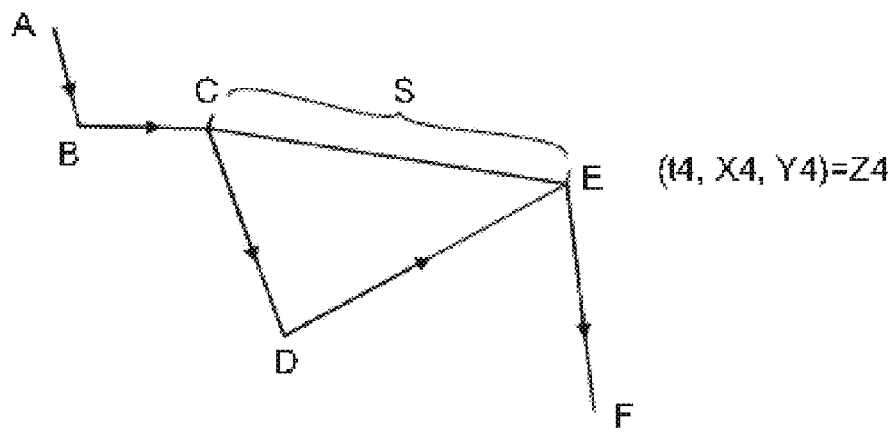
FIGS. 4a and 4b illustrate the calculation and formation of a matrix in more detail.
Figure 4B:
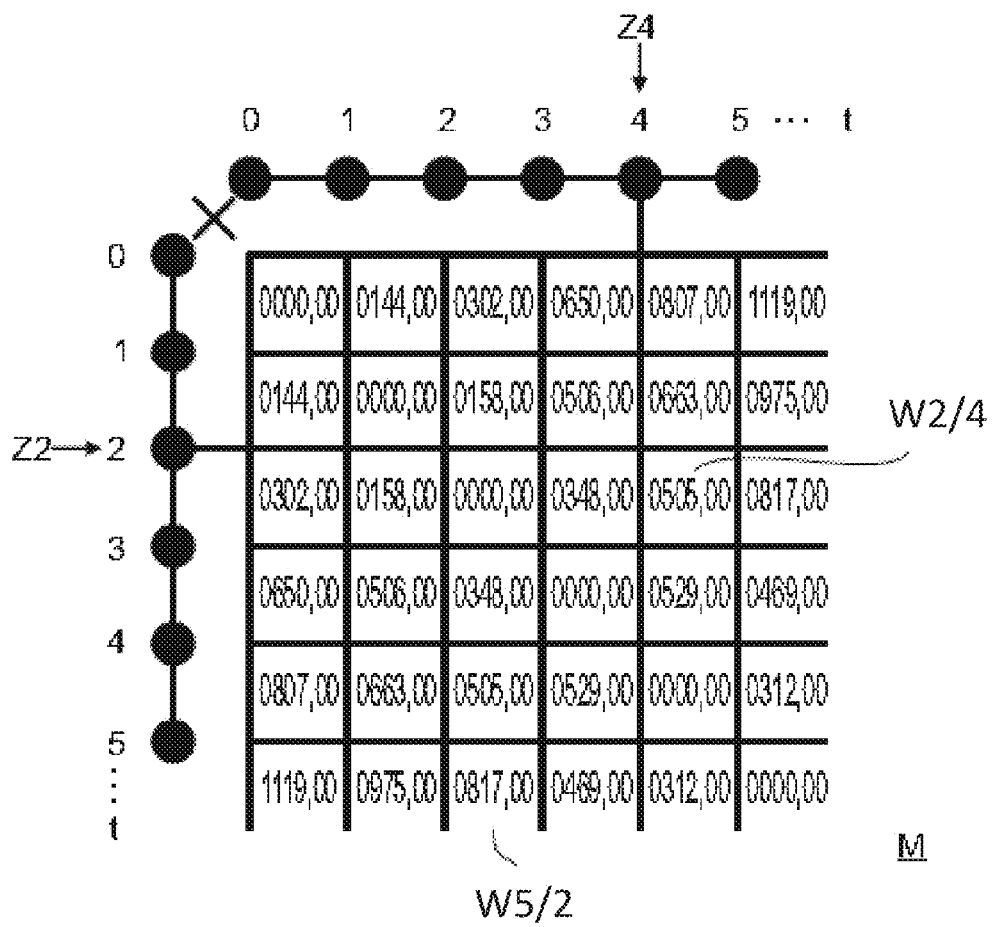

By means of FIGS. 4a and 4b, the calculation and formation of the matrix is illustrated in more detail. FIG. 4a shows a very simplified gaze trajectory or scanpath starting from point A and going to point E and then further going to points F etc. The FIG. 4a just shows the begin of a scanpath, but not the complete scanpath for sake of simplification. Each view point is represented by a number triplet indicating the time t and the respective spatial coordinates X and Y. The view point E has, for example, the triplet (t4, x4, y4) (counting starts at 0) which can also be denoted as number group Z4. According to the invention the number groups Z0, Z1, Z2, Z3, Z4, ..., Zn are now combined in pairs, in each case the distance S (see FIG. 4a) is determined between the two pixels, and is entered into a matrix M (see FIG. 4b).

In FIG. 4b, the structure of the matrix M is illustrated. The value of W2/4 indicates the distance between the view or gaze points E and C, or between the number groups Z2 and Z4. The operation is carried out for all possible 2-point combinations. A sampling frequency of 1000 Hz being applied in a measurement period of 1 second already produces a data volume of 1000×1000 triplets. But this data volume can significantly be reduced by the filtering being described later.

Figure 5A:
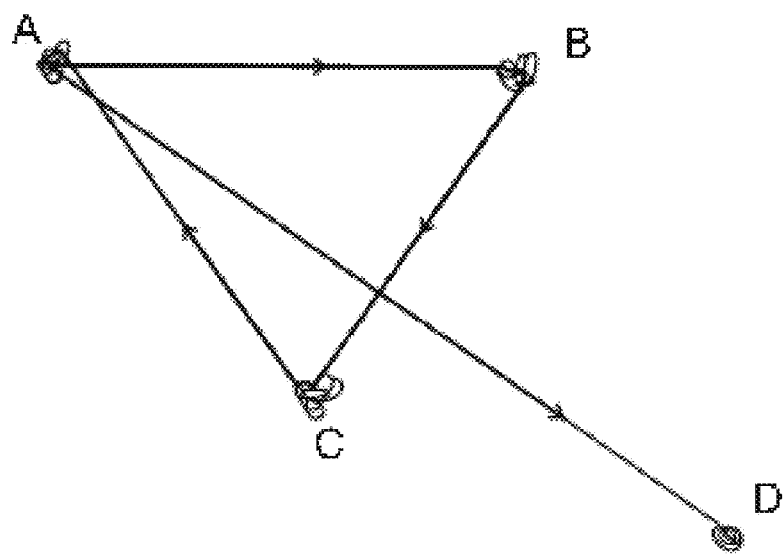
FIGS. 5a and 5b illustrate obtaining a more extensive first matrix.
Figure 5B:
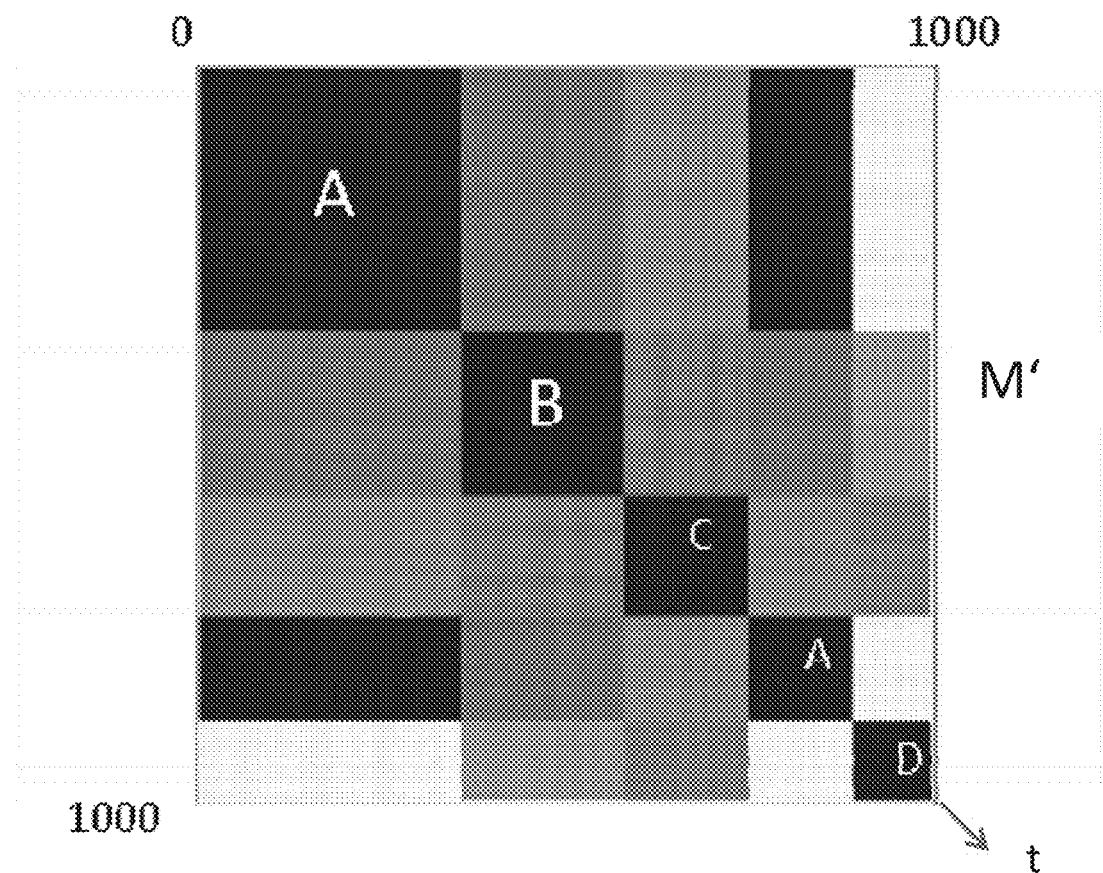
Figure 6A:
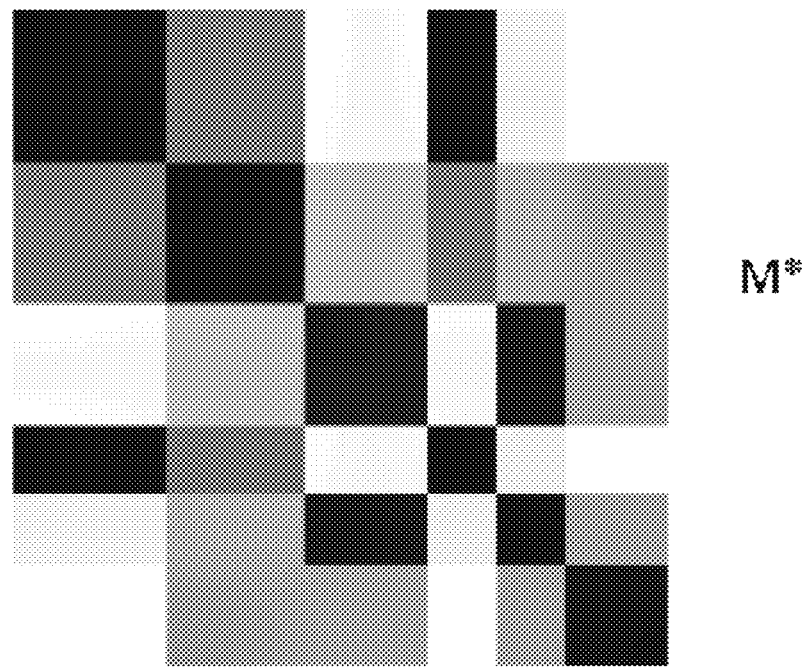
FIG. 6a illustrates a filtered matrix that can be converted into a standardized representation.
Figure 6B:
FIG. 6b illustrates a threshold-filtered, black-white matrix almost as 2D matrix.
Figure 7A:
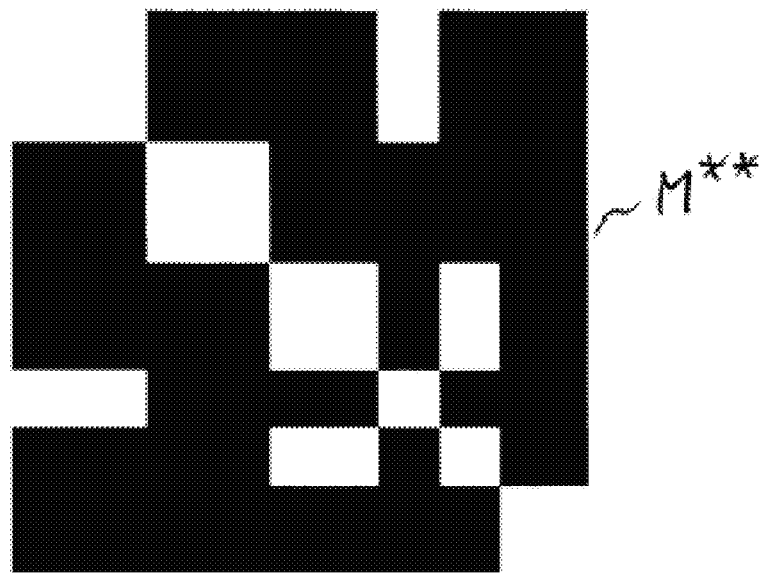
FIGS. 7a and 7b illustrate replacing the squares of the diagonals by letters and the couplings, to obtain a representation for a scanpath through a sequence of letters (string representation) "ABCACD".
Figure 7B:
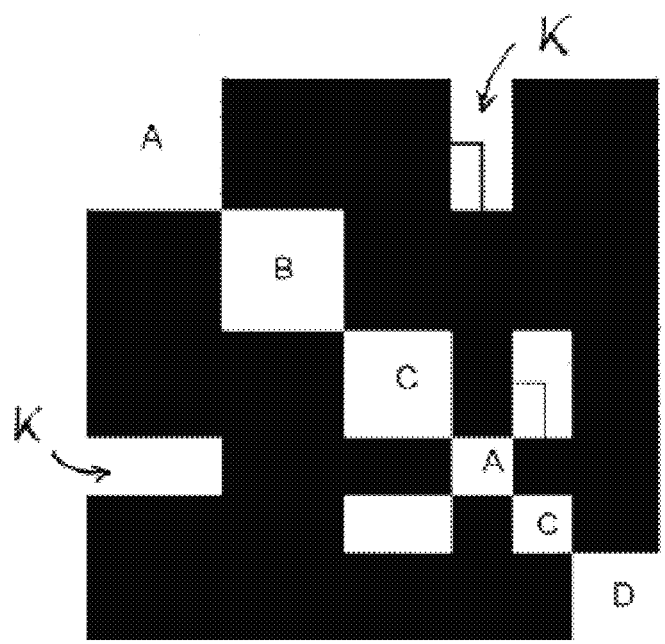
Figure 8:
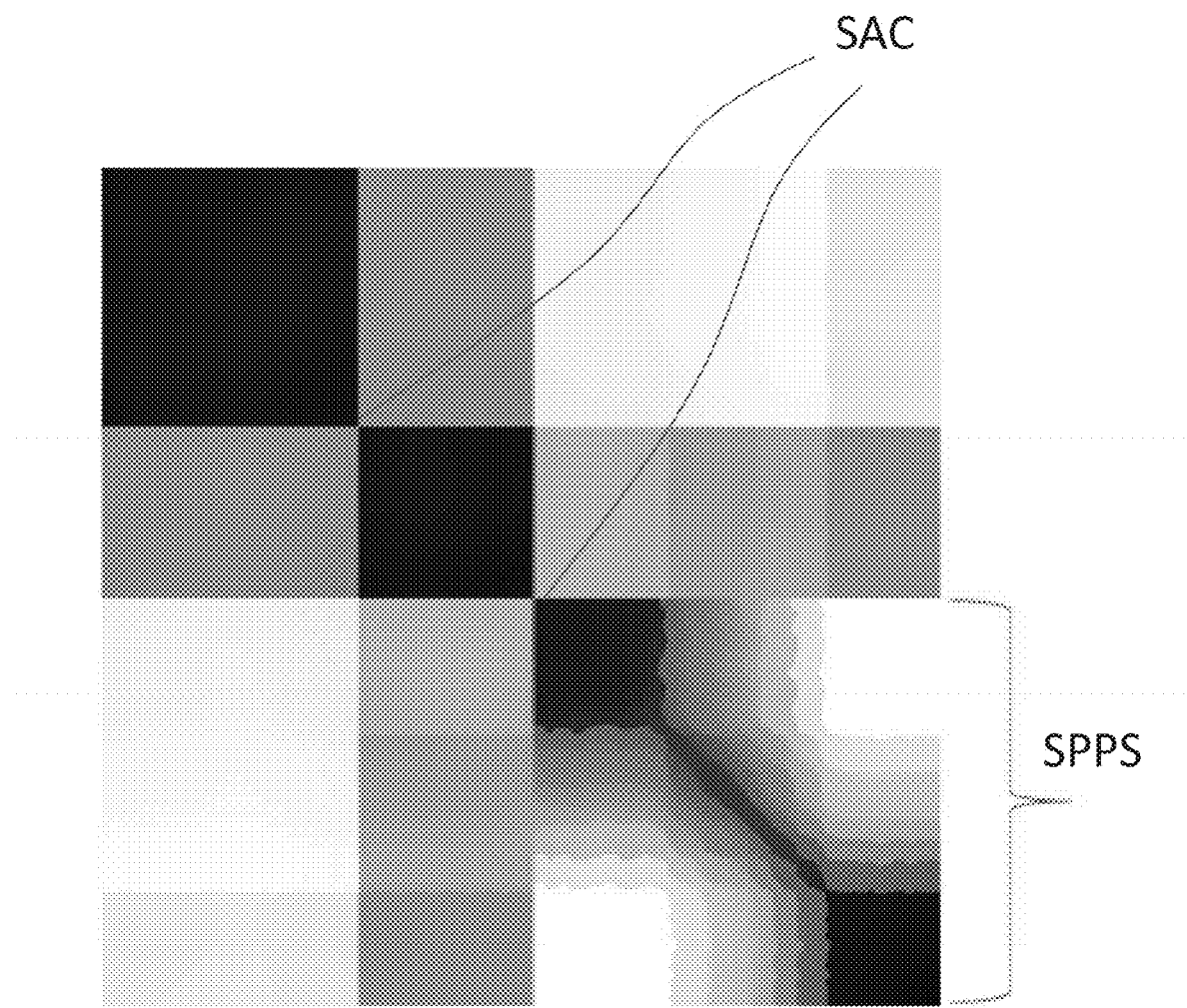
FIG. 8 shows the smooth pursuit path section SPPS for a level line pattern in contrast to saccades SAC which form sharp corners.

First, a pretty extensive first matrix is obtained. This is illustrated by means of one more example (see FIGS. 5a and 5b):

As shown in FIG. 5a, the gaze movement is somewhat more extensive than in FIG. 4a, but is a complete short scanpath; the gaze starts first from region A (first fixation) and jumps (first saccade) to the region B (second fixation). Then it goes to area C (third fixation) and from there back to area A (fourth fixation) and then to the area D. Thus the first fixation A is visited again, this means that position data of the first fixation are spatially highly correlated with the data of the fourth fixation.

This behavior of viewing (visual behavior) is not fully reflected in the scanpath diagram of FIG. 5a (or FIG. 4a), because only the spatial dimension is shown but not the temporal dimension. But the visual behavior can fully be reflected in the structure of the resulting matrix M' shown in FIG. 5 (or M in FIG. 4b):

Starting from t=0 (upper left corner) up to t=1000 (lower right corner) there initially is a larger dark square, its extension reflects the temporal duration of a dwell at the fixation area A. Then (along the diagonal) a smaller dark square appears, its extension represents the dwell time at the fixation area B. The adjacent areas (rectangular coupling fields) show by their gray value that this second square specifies another fixation region (namely B) which is spaced apart from the first region A. The gray values are therefore a measure of the distance between the regions A, B, C, .... As can be seen from the penultimate square, there are two very dark areas which are associated with the latter and the first square (same column or row). The low gray value indicates that the two squares refer to regions which are very little spaced apart from each other: That is to say that the penultimate square (on the diagonal) is also assigned to the area A (see return jump in FIG. 5a). The last square, however, has is coupled to the first square with almost white coupling fields, i.e. the last square refers to an area (namely D) which is very far from the first area A.

The data volume of the matrix M or M' can be reduced considerably, but the validity of the matrix structure does not suffer from this. On the contrary: The data reduction (by anisotropic filtering and/or by threshold-filtering) proposed here rather increases the conciseness of the matrix structure (filtered matrix in FIG. 6a) and can even be converted into a standardized representation (threshold-filtered, black-white matrix almost as 2D matrix code in FIG. 6b) to comply with usual forms of representations ("ABC string", see next section).

The Invention Also Comprises an Extraction of the Path Sections by Space-Time Filtering:

A basic description of the scanpath, as is the current state, is the symbolic form of the sequence of fixations as a sequence of letters "ABCADEBE..." and of the parameters being associated with the fixations, like duration of a fixation/spatial extension of a fixation. In addition, parameters can be determined to characterize a saccade, e.g. a jump distance/direction of a saccade. The conventional solutions achieve the extraction of such variables or quantities by deriving the saccades from the trajectory data according to the initially mentioned criteria. For this purpose, a manual data analysis is often required. The fixations are then set as portions between the saccades.

In contrast, the proposed solution extracts the quantities of interest from the space-time matrix, and can be carried out fully automatically. The extraction is carried out in several steps. The first step comprises filtering of the space-time matrix (space-time filtering STF). This is an anisotropic filtering with two coupled nuclei, e.g. two Gaussian kernels:

$$STF([d]_p) = \frac{1}{W_p} \sum_{q \in T^2} G_{\sigma_t}(\|p-q\|) G_{\sigma_s}(|d_p - d_q|) d_q$$

The factor $W_p$ normalizes the Gaussian weights to 1:

$$W_p = \sum_{q \in S} G_{\sigma_t}(\|p-q\|) G_{\sigma_s}(|d_p - d_q|)$$

The parameters $\sigma_t$ and $\sigma_s$ and are not to be regarded primarily as numeric parameters, but as parameters having a fundamental physiological relevance and thus are depending on the physiological/psychological model. A small $\sigma_t$ means a close temporal coherence in the process of observation and a small $\sigma_s$ means a close spatial coherence between the observed contents. The procedure of filtering is analogous to that of the bilateral image processing. The result is a reduced scheme which contains, in two-dimensional form, the basic information about the process at the level of eye/view data. Such a scheme is shown by a smooth-filtered matrix M* in the FIG. 6a:

The square blocks along the main diagonal of the matrix (see also FIG. 5b) encode the fixations. The edge length as well as the number of elementary cells along the diagonal of a block, represents the duration of fixation. The gray values in the square block along the diagonal of the space-time filtered STM (smooth-filtered/anisotropic filtered matrix M*) correspond to the average spatial extent of the fixation. The gray values in the rectangular blocks in the remaining part of the matrix correspond to the average distances between fixations. By setting a threshold for the spatial distance in the STM to the spatial dispersion of a medium fixation, the matrix can be further simplified resulting in a threshold-filtered matrix M**. This is illustrated by means of the FIG. 6b in comparison with FIG. 6a.

In this illustration, the outer appearance of the encoding of the scanpath resembles to the known matrix code encoding, such as being used by DataMatrix for the encoding of internet links, postage stamps, commodities, etc. Now the squares of the diagonals are replaced by letters and the couplings are taken into account, so that we currently obtain the usual representation for a scanpath through a sequence of letters (string representation) "ABCACD". This is illustrated by means of FIGS. 7a and 7b.

The representation of the scanpath as a character string ("ABC string") is the current standard. But the derivation also shows how much information has been discarded on the way to the string representation.

The provision/evaluation of this information is also subject of the invention. For this purpose, the invention proposes to encode the gaze trajectory (scanpath) in the form of an extended matrix code according to FIG. 5b. The matrix code is extended, because it does not use black/white modules, but modules with gray scale values, a matrix gray scale code. This representation can encode substantially more information than the string representation and shall be the basis of extended evaluations. For purposes of comparability, the proposed solution can also work with the string representation. Thus, the Levenshtein distances between strings are determined.

The anisotropic filtering can be regarded as the limit of anisotropic diffusion, which is described by a partial differential equation. By using a suitable choice of the diffusion tensor, other features of the STM can be extracted. This particularly allows the smooth pursuit movement to be cleanly extracted from the data. The smooth pursuit is relevant for dynamic scenes where the viewer's eyes follow a moving object. For the automatic determination of the smooth pursuit, there is currently no standard yet. The simultaneous determination of saccades, fixations, and smooth pursuit movements for dynamic scenes is considered to be exceptionally complicated (ternary classification). The application of anisotropic diffusion on the space-time matrix allows to easily recognize this section within the scanpath beside the fixations and saccades, see matrix M'' in FIG. 8 where the smooth pursuit path section SPPS shows a level line pattern in contrast to saccades SAC which form sharp corners.

The Invention Also Includes a Comparison of Scanpaths:

For further analysis, the (information-theoretic) structure of the distance matrix is significant (see also block 120 in FIG. 2). Fundamental to the further procedure is the information equivalence between the distance matrix and the range or spectrum of distances. That means, formally, that the distribution of distances (range of distances) $his_{GP}(d) = \#\{(i,j) | 0 \le i < j \le n, d(GP_i, GP_j) = d\}$ has essentially only one scanpath as solution. This allows that two scanpaths or two different sections of a scanpath, can be put into relationship by comparing their histograms. As similarity measure the usual distance measures for spectra can be taken, such as the Kullback-Leibler divergence, Jensen Shannon divergence, $X^2$ tests, Kolmogorov-Smirnov test, Earth Mover's-distance, histogram average, cosine distance, Euclidean distance, etc.

An increase or reduction of the level of detail in the comparison can be achieved if the overall structure of the distance matrix is considered/not considered. To this, the fine structure of the distance matrix is treated as texture. So the Tamura texture histogram, Gabor features, local image feature patches histogram, local image feature SIFT histogram, edge histogram, etc. can be evaluated.

Figure 11:
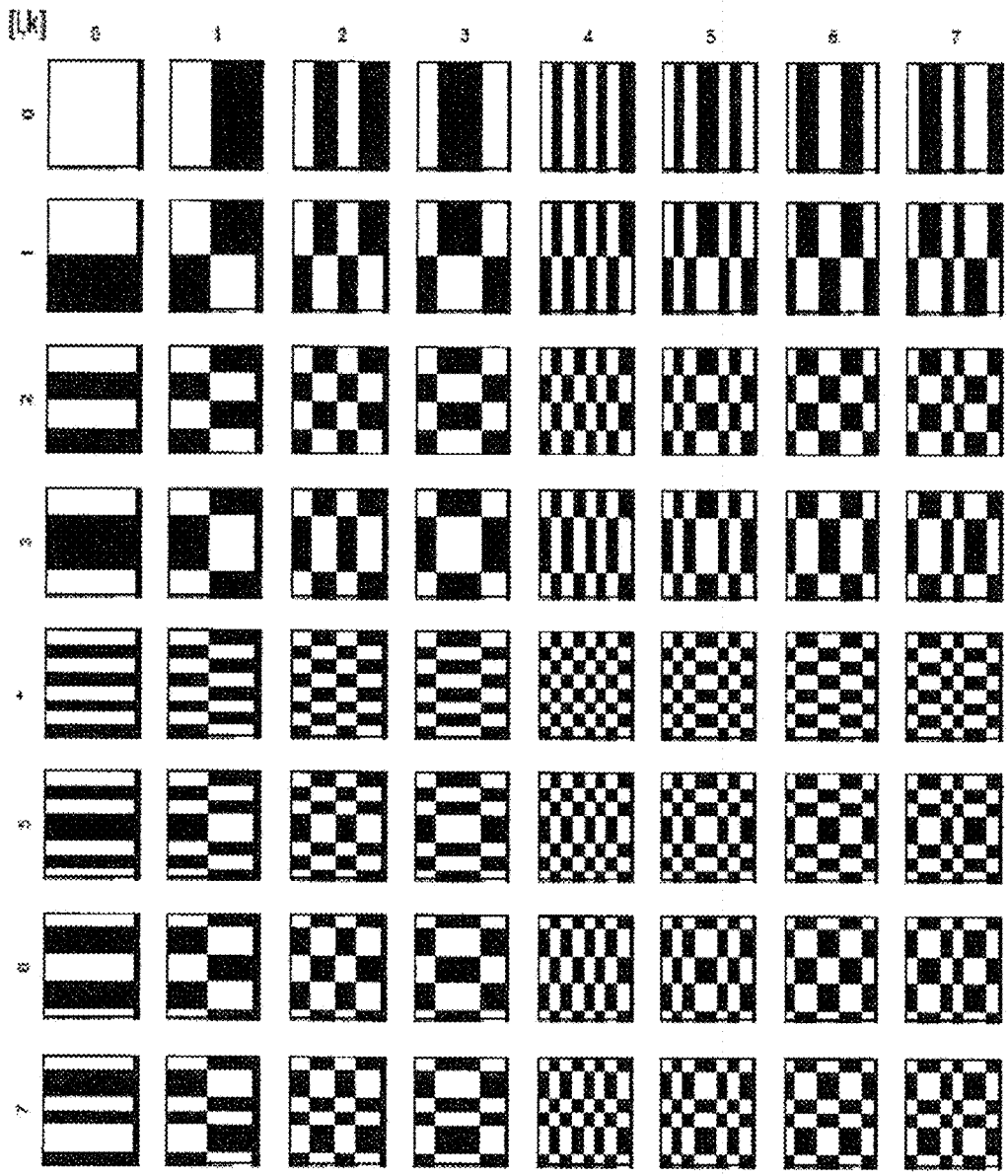
FIG. 11 illustrates exemplary Walsh functions for the 8×8 system.
Figure 12:
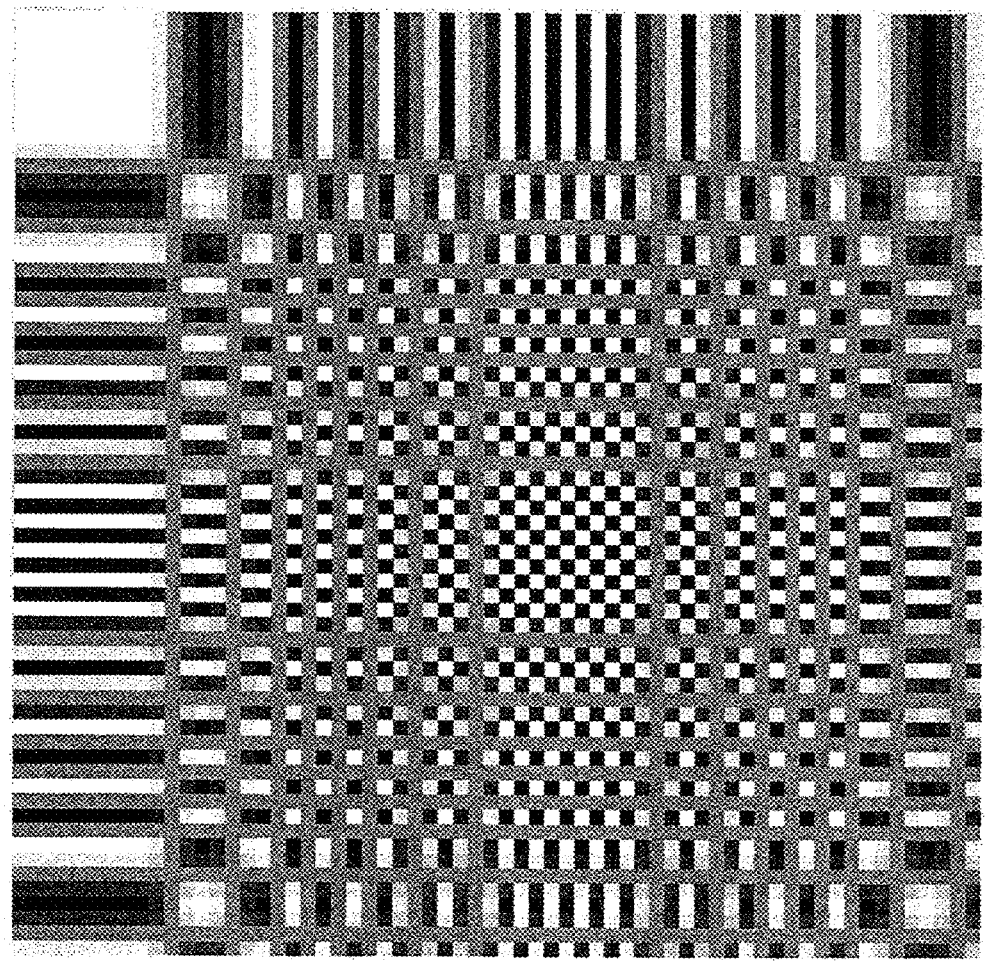
FIG. 12 illustrates cosine functions being used for an 8×8 system.
Figure 13:
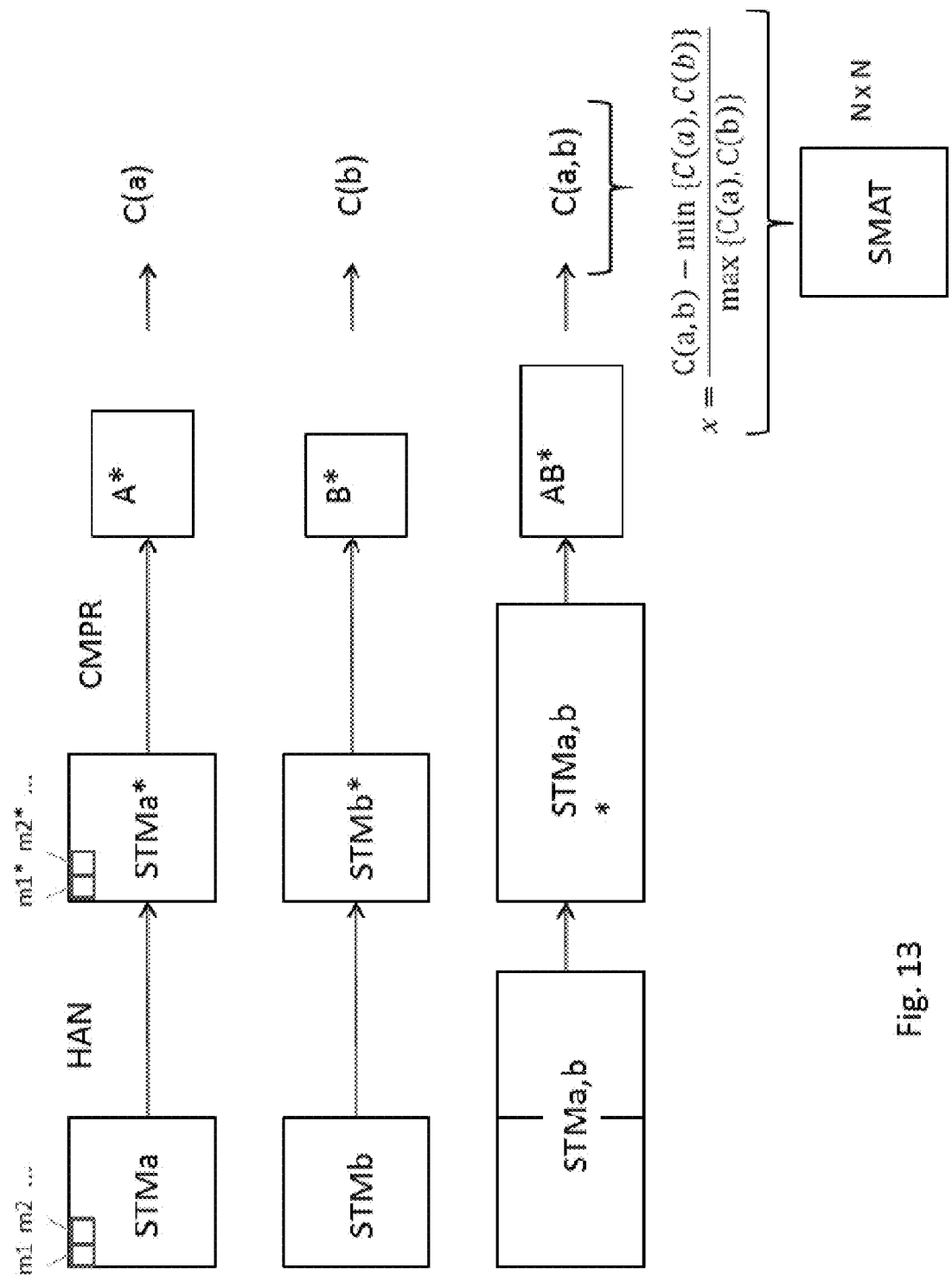
FIG. 13 illustrates processing and comparison of two scanpaths represented by matrices STMa and STMb.

The invention still provides further variants of comparing scanpaths or viewpaths. This will be described here with reference to FIGS. 11-13. In FIG. 13 the processing and comparison of two scanpaths represented by matrices STMa and STMb are illustrated:

The variant of comparing scanpaths is based on the normalized compression distance-coded in the form of STM codes scanpaths.

$$x = \frac{C(a, b) - \min\{C(a), C(b)\}}{\max\{C(a), C(b)\}} \qquad (1)$$

C(a) and C(b) indicate the length in bits of the compressed STMs (space-time matrices) of the paths a and b, C(a, b) is the length of the combined path comprising a and b. The expression (1) is not the only possible one. The invention offers different expressions but the final result is robust under the choices, so only one common expression is shown here. The compression of the paths is done by using the standard methods in computer science for data compression, but in a tailored manner to the problem. The compression of each STM (see STMa, STMb and STMa,b in FIG. 13) represents the approximation to the Kolmogorov complexity of the STM, which is defined as the length of the shortest program for calculating the STM on a general purpose computer. This will be explained by the following two examples. It should be noted that the choice of the compression method can be arbitrary in principle. But in particular the choice being adapted to the structure of the STM allows to focus on the interesting aspects from a technical perspective and reduces the computation time in a practicable time. Therefore, the invention makes use of the known common methods of computer science for data compression and thus allows the end user a variable approach. The use of the Kolmogorov complexity as a theoretical basis for the data analysis is known as such in the literature and will therefore not be discussed further. Relevant to the invention is their concrete implementation in combination with the STM:

According to the invention (see FIG. 13), the determination of the special similarity occurs in two general steps. In a first step, the STM (e.g. STMa in FIG. 13) is decomposed into sub-matrices (m1, m2, . . . ), whereby their size is variable. This depends on the sampling rate of the eye tracker and on the physiological time scale which is meaningful for the problem (if fixations are considered, this is in the range of 100 ms). Thus a 128×128 matrix could be divided into 16×16 or 8×8 matrices. A power of 2 is not required but it simplifies the scaling. The individual sub-matrices are then subjected to a discrete harmonic analysis (see HAN in FIG. 13). For this purpose, multiple functions systems are used. The choice of system depends on the detail of the STM. Hence, Walsh functions for the filtered black and white matrix are particularly suitable. In the accompanying FIG. 11, the Walsh functions for the 8×8 system are exemplified.

A system being suitable for harmonic analysis in the gray scale range consists of discrete cosine functions. For this purpose, the FIG. 12 shows cosine functions being used for an 8×8 system.

The results of the harmonic analysis HAN which is applied to each sub-matrix m1, m2, . . . of each STM (i.e. STMa, STMb and combined matrix STMa,b) are transformed sub-matrices m1*, m2* of the used basis system (e.g. Walsh). This means here that each sub-matrix (e.g. m1*) comprises the weights of the respective Walsh function. The first entry or most significant weight in the sub-matrices is predictive-coded.

The second step involves the underlying comparison by compression CMPR. This is based on predictive, run-length, and entropy encoding of the transformed paths in separate and combined version. The transformation weights are therefore either block-coded or coded in a separate sequence for each base function. The entropy coding is done for example in the form of a Huffman coding or arithmetic coding. Since it depends only on the relative comparison of the compression rate, the arithmetic coding is only used for theoretical investigations. The compressed matrices A*, B* and AB* mainly comprise the most significant coefficients and thus have a reduced volume in comparison to the input matrices. The compression rate (about 10-40%) or reduced volume can be expressed by values C(a), C(b) and (Ca,b). This means that in the final form, there are three coded scanpaths which are combined according to the above equation (1) to a distance value (or better to say a similarity value) or expression. This is done for all pairs of paths to be compared. The result is a matrix of coefficients (see similarity matrix SMAT in FIG. 13) which serves as input for a clustering method. The clustering is done with the conventional methods of data mining and provides e.g. a hierarchical tree or a self-organizing map.

The described comparisons are far more precise and more deep-seated than the methods currently described in the literature. These represent the sequence of the fixations in a character string and then use the string editing distance and dynamic programming as a measure of similarity or dissimilarity. The determination of the string is done by assigning the specific fixations which are determined in the first step to the areas of interest (AOI) or regions of interest (ROI) which appear in the stimulus/scene. The determination of the AOI can be achieved by a simple gridding of the space/plane or by criteria being set by the end user according to human judgment (Gridded AOI and Semantic AOI). Another aggregation can be achieved by a clustering of the fixations through clustering algorithms.

Figure 9:
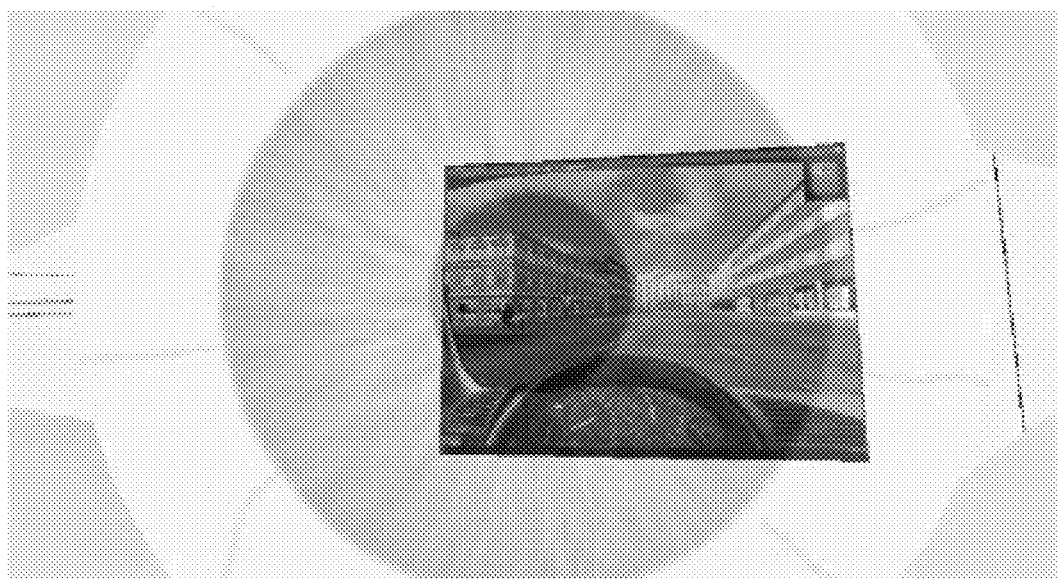
FIG. 9 illustrates a 2D representation which be performed and shown in print, as a substitute for a 3D representation.
Figure 10:
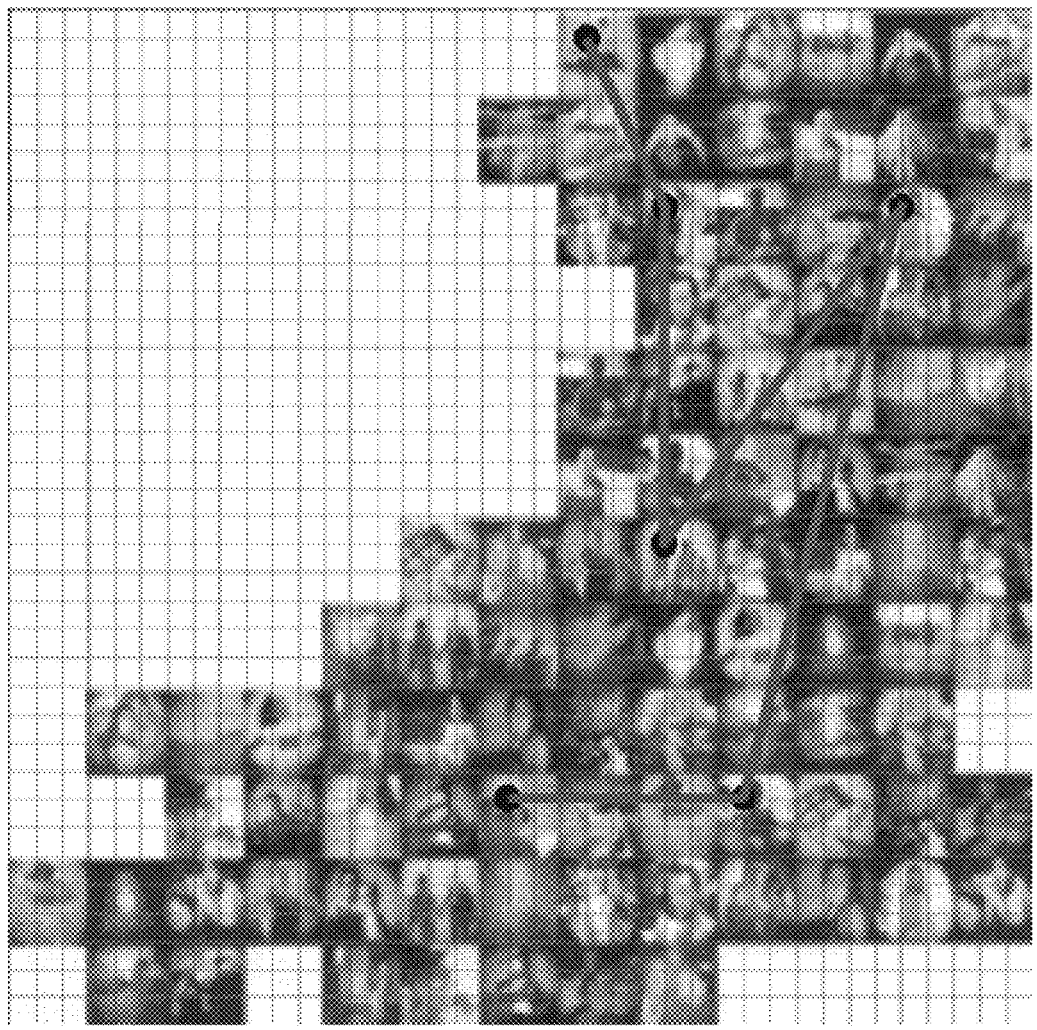
FIG. 10 illustrates a process model for the eye/gaze data and that can be tested directly by the experimental data.

The Invention Also Includes the Presentation of the Eye Movement Data, and the Formulation of a Hypothesis for the Scanpath:

The eye tracking data collected in the context of the presented scene allow a determination of the retinal image of the observer. This allows it to provide to the experimenter the particular scene in the form of a 3D representation. So to speak, the experimenter can see the scene as it were sitting in the eye of the subject. This allows the experimenter to obtain an accurate subjective picture of what is considered by the subject. This makes it possible to precisely express a hypothesis about the eye movements in the context of the scene. The representation of the scene can be performed in 3D, wherein the 3D effect is achieved by color shift as well as by the use of a shutter glasses technology. As an option, also a 2D representation can be performed. This is shown in FIG. 9, since a 3D representation cannot be shown in printed form (printout).

For Formulating a Hypothesis about the Scanpath the Following can be Said:

The viewed scene can be spatially quantized. The spatial regions correspond to the ROIs. By use of the mouse a fixation in a ROI can be simulated by a single or multiple key/button press. The number of key presses correspond to the duration of the fixation. These can freely be selected as a parameter. The hypothetical scanpath thus obtained is recorded and can then be compared with the experimental data of the individuals in the database. The statistical analysis of the similarities between the hypotheses and the observed data then provides the necessary significance of the formulated hypothesis. This procedure allows for a high abstract level, to obtain a process model for the eye/gaze data and to be tested directly by the experimental data. See FIG. 10.

The Invention Also Allows the Export of the View Process in a Cognitive Process:

The interpretation of the so-obtained process model for the eye/gaze data occurs in a cognitive model (see also block 130 in FIG. 2). Within psychology there are various cognitive models/architectures, such as ACT, SOAR, EPIC, etc. The proposed invention provides an interface to link the process model of the eye-gaze data to the process model of the cognitive process.

In Addition, the Invention Includes an Integrated Data Storage:

Due to the wide-ranging technical issues the collection and exchange of data through multicenter studies is desirable. This requires as open as possible and simple structured data organization. The solution includes two forms of data storage. For managing large data sets there is a link to a marketable relational SQL database. Furthermore, the data can be directly stored in a XML-formatted way in text files (NoSQL concept). During runtime the solution works because of the performance with an in-memory database. When creating the individual data sets, the solution assigns GUIDs (Globally Unique Identifier) to avoid that in multicenter studies the keys are multiply assigned, and that thus the merging of several data sets is allowed.

In Summary, the Following Properties can Briefly be Stated Here:

The invention provides a process for the collection, compilation, presentation, and/or evaluation of eye movement data in an integrated environment. The representation of eye/eye movements is achieved by a matrix of gray values (matrix gray code).

The invention provides a simultaneous ternary decomposition of eye movements or raw eye tracking data in fixations, saccades and smooth pursuit movements in the viewing of static and dynamic scenes. A comparison of scanpaths is achieved through comparisons of histograms for different features and by evaluating the Kolmogorov complexity of the encoded raw scanpath data.

The method proposed here is inter alia to collect eye movement data for predetermined paradigms such as free viewing, search task, Raven's Progressive Matrices, Stroop, Change Blindness, etc. The method also serves for a collection of free static and dynamic scenes, such as the viewing of an advertising poster, commercials, film, video game, flight or driving simulation, interaction with a graphical user interface. It enables manual definition of ROIs over both static and dynamic scenes. Moreover, the method permits automatic determination of the static and dynamic ROIs.

The method is suitable for storing eye-tracking data for multicenter studies in connection with the data of the viewing paradigms. The method is also suitable for automatic segmentation of investigated subject groups. There is achieved, inter alia, a statistical and visual representation of the results in an integrated environment.

The method is suitable for the 3D representation of the gaze data/back-calculation of the data on the visual field and its representation as a 3D scene. Further, the method is suitable for freely making hypotheses on scanpaths and comparison of the hypotheses with the data of the database as well as statistical testing of the hypothesis.

What is claimed is:

1. A method of encoding eye movements and eye tracking data, wherein the eye movements and eye tracking data are represented as time and space parameters in the form of groups of numbers being obtained by means of an eye tracking device and each group of numbers being assigned to a viewpoint, wherein pairs of numbers are taken from the groups of numbers and are combined with each other to obtain for each combination a value that indicates at least a spatial distance between two viewpoints to which the respective pair of numbers is assigned, wherein the obtained values represent an encoding or code of the eye movement and eye tracking data, wherein the values are determined and stored in form of a first matrix or array which represents a scanpath and wherein at least two matrices are determined, each matrix representing a scanpath and wherein the matrices are processed and compared to obtain for each comparison a similarity value X that indicates the similarity of visual behaviors with respect to the compared scanpaths;

wherein the groups of numbers represent triples of numbers according to the time and space parameters, and wherein two triples of numbers are taken in pairs and are combined with each other to obtain for each combination a value that indicates at least the temporal and spatial distance between two viewpoints, wherein the similarity value of scanpath is characterized by its Kolmogorov complexity in the form of its compressibility which is based on a predictive, run-length, and entropy encoding of the distance encoded scanpath, wherein the predictive, run-length, and entropy encoding includes a Huffman encoding, and wherein the sub-matrices are each subjected to a harmonic analysis to obtain transformed sub-matrices.

2. The method of claim 1, wherein the harmonic analysis is performed by means of Walsh functions or cosines functions.

3. The method of claim 1, wherein transformed sub-matrices or a transformed matrix comprising said sub-matrices are/is subjected to a compression process to obtain a compressed matrix including most significant coefficients and having a reduced volume.

4. The method of claim 3, wherein the reduced volume or the compression rate derived thereof is expressed by a value C that denotes the lengths in bit of compressed matrix of the scanpath, and wherein the similarity values constitute the elements of a similarity matrix which serves as a basis for clustering methods.

5. The method of claim 3, wherein the several scanpaths represented by their matrices are combined in pairs to obtain for each combination the similarity value X that indicates the similarity of visual behaviors with respect to respective pair of compared scanpaths, according to the following equation:

$$x = \frac{C(a, b) - \min\{C(a), C(b)\}}{\max\{C(a), C(b)\}} \quad (1)$$

wherein C(a) and C(b) denote lengths in bit of compressed matrix of the scanpaths a and b, and C(a,b) denotes the length of the combined scanpath of a and b.

6. The method of claim 4, wherein the similarity matrix is subjected to a clustering method to obtain a hierarchical structured tree or a self-organizing map.

* * * * *